United States Patent
Sharma et al.

(10) Patent No.: US 12,360,692 B2
(45) Date of Patent: Jul. 15, 2025

(54) DYNAMIC MODE SELECTION FOR HYBRID SINGLE-LEVEL CELL AND MULTI-LEVEL CELL DATA STORAGE DEVICES

(71) Applicant: WESTERN DIGITAL TECHNOLOGIES, INC., San Jose, CA (US)

(72) Inventors: Amit Sharma, Bengaluru (IN); Abhinandan Venugopal, Bengaluru (IN)

(73) Assignee: Sandisk Technologies, Milpitas, CA (US)

( * ) Notice: Subject to any disclaimer, the term of this patent is extended or adjusted under 35 U.S.C. 154(b) by 0 days.

(21) Appl. No.: 18/447,738

(22) Filed: Aug. 10, 2023

(65) Prior Publication Data

US 2025/0004657 A1   Jan. 2, 2025

Related U.S. Application Data

(60) Provisional application No. 63/510,443, filed on Jun. 27, 2023.

(51) Int. Cl.
   *G06F 3/06* (2006.01)
(52) U.S. Cl.
   CPC .......... *G06F 3/0634* (2013.01); *G06F 3/0604* (2013.01); *G06F 3/0685* (2013.01)
(58) Field of Classification Search
   CPC ..... G06F 3/0634; G06F 3/0604; G06F 3/0685
   See application file for complete search history.

(56) References Cited

U.S. PATENT DOCUMENTS

| | | | | |
|---|---|---|---|---|
| 11,256,436 B2* | 2/2022 | Paley | ................... | G06F 3/0644 |
| 2013/0173844 A1* | 7/2013 | Chen | ................... | G11C 16/349 |
| | | | | 711/E12.008 |
| 2013/0346676 A1* | 12/2013 | Kim | ................... | G06F 12/0246 |
| | | | | 711/103 |
| 2015/0213896 A1* | 7/2015 | Lieber | ................ | G11C 16/3495 |
| | | | | 711/103 |
| 2020/0004671 A1* | 1/2020 | Neufeld | ................. | G11C 16/10 |
| 2020/0264792 A1* | 8/2020 | Paley | ................... | G06F 3/0659 |
| 2022/0043604 A1* | 2/2022 | Kurita | ................... | G06F 3/0604 |
| 2022/0326877 A1* | 10/2022 | Byom | ................. | G06F 12/0875 |

* cited by examiner

*Primary Examiner* — Ryan Bertram
(74) *Attorney, Agent, or Firm* — Patent Law Works LLP

(57) ABSTRACT

Systems, methods, and data storage devices for dynamic mode selection for hybrid MLC/SLC data storage devices are described. Storage operations at a plurality of storage devices from a host device may be processed, wherein each storage device of the plurality of storage devices comprises a plurality of partitions including multi-level cell blocks and single-level cell blocks and multi-level cell blocks may be selectively written in a single-level write operation. A usage value is determined for each partition of the plurality of partitions at each storage device of the plurality of storage devices. A storage device of the plurality of storage devices may be dynamically selected based on the usage value for single-level cell blocks of the selected storage device having available single level cell blocks. New data may then be stored at the dynamically selected storage device of the plurality of storage devices.

20 Claims, 7 Drawing Sheets

DYNAMIC MODE SELECTION FOR HYBRID SINGLE-LEVEL CELL AND MULTI-LEVEL CELL DATA STORAGE DEVICES

TECHNICAL FIELD

The present disclosure generally relates to increased storage device endurance and performance and, more particularly, to dynamic mode selection for storage using multi-level and single-level cell blocks.

BACKGROUND

Data storage devices, such as disk drives (solid-state drives, hard disk drives, hybrid drives, tape drives, etc.), universal serial bus (USB) flash drives, secure digital (SD) cards and SD extended capacity (SDXC) cards, and other form factors, may be used for storing data on behalf of a host, host system, or host device. These storage devices may include integrated storage devices built into the enclosure of the host device, removable storage devices mating with the host device through a physical interface connector (directly or through an interface cable), and network storage devices communicating with the host device using network protocols over a wired or wireless network connection. Some removable storage devices and/or network storage devices may use short range wireless communication, such as Bluetooth, ultra-wideband (UWB), Wi-Fi, Zigbee, etc., for communication with a host device or network. Storage devices may be integrated into storage systems that vary from single storage devices directly supporting a host device through a peripheral storage interface to multi-device storage systems (often supporting multiple host systems) that include multiple storage devices arranged in an array of drives interconnected by a common communication fabric and, in many cases, controlled by a storage controller, redundant array of independent disks (RAID) controller, or general controller, for coordinating storage and system activities across the array of drives.

In a single storage environment, a host device may only have one solid-state drive (SSD) to store data, but in a multiple storage environment, a host device may have access to multiple SSDs. Data may be written to memory cells in SSDs in different configurations. A single-level cell (SLC) NAND flash memory stores one bit of data per cell of flash media. A multi-layer cell (MLC) NAND flash memory typically stores two bits of data per cell of flash media. A triple-level cell (TLC) NAND flash memory stores three bits of data per cell of flash media, and a quad-level cell (QLC) NAND flash memory stores four bits of data per cell of flash media. While MLC, TLC and QLC configurations enable a larger amount of data that can be stored in a NAND flash device of similar size, the endurance of the storage device deteriorates as more dense configurations are used. Additionally, while a SLC memory configuration provides higher cell endurance and lower power consumption, SLC memory involves higher manufacturing costs and lower densities.

A solid-state storage program/erase cycle (P/E cycle or PEC) is a sequence of events in which data is written to a solid-state NAND flash memory cell and then is subsequently erased and rewritten. The maximum number of P/E cycles depends on the type of cell density used in writing data. For example, TLC NAND manufacturers may guarantee 800-1000 P/E cycles, MLC NAND manufacturers may guarantee at least 3,000 P/E cycles, and SLC NAND manufacturers may guarantee between 30,000 and 100,000 P/E cycles. Hosts may measure SSD life in TBW (Terabytes Written).

SSDs may employ a flash management scheme that uses both SLC blocks and MLC blocks on the same NAND flash media. Here, MLC may refer to any NAND flash media where 2 or more bits can be written per cell. In an embodiment, another flash management scheme may be referred to as "Hybrid" because data can be selectively written as single-level cell (SLC) blocks on multi-level cell (MLC) blocks as well as written directly to SLC blocks and MLC blocks. Thus, this flash management scheme may include three different partitions. While approaches that use multiple types of blocks on NAND flash media exist, such as in folding platforms where host data is prioritized to be written to SLC blocks and SLC blocks on MLC blocks first, a key disadvantage of using SLC blocks on MLC blocks is that once blocks are used as SLC and erased, the block loses 1 P/E cycle. For an MLC NAND flash device that has four bits to a cell ("X4"), the number of PECs is approximately 1,000. Thus, storing data using the SLC block mode on MLC decreases the TBW of the storage device.

A dynamic selection of data storage devices that informs the host device of a usage for partitions in each SSD of a multiple storage device environment may be advantageous. An effective interface for requesting the usage values by block type and providing a policy for SSD selection to the host device may be needed.

SUMMARY

Various aspects for dynamic mode selection for hybrid MLC/SLC data storage devices are described.

One general aspect includes a system including a storage device controller that includes processing resources and is configured to: process, using the processing resources, a plurality of storage operations at a plurality of storage devices from a host device, where each storage device of the plurality of storage devices may include a plurality of partitions including multi-level cell blocks and single-level cell blocks and multi-level cell blocks are configured to be selectively written in a single-level write operation; determine a usage value for each partition of the plurality of partitions at each storage device of the plurality of storage devices; dynamically select a storage device of the plurality of storage devices based on the usage value for single-level cell blocks of the selected storage device indicating a plurality of available single level cell blocks, and store new data at the dynamically selected storage device of the plurality of storage devices.

Implementations may include one or more of the following features. The usage value may be determined from: a number of available single level cell blocks; a number of programmed single level cell blocks; and a total usage value for each partition of each storage device. The storage device controller may be further configured to: receive, through a host interface, a partition usage value; determine, based on the partition usage value, a partition usage period; and detect an increase in storage operations over the partition usage period. The storage device controller may be further configured to: receive, through a host interface, a policy for handling a substantial change in partition usage; determine, based on the policy for handling a substantial change in partition usage, a partition usage threshold value; and detect an increase in storage operations at a particular storage device of the plurality of storage devices corresponding to the partition usage threshold value. The storage device controller may be further configured to: determine, based on the increase in storage operations at the particular storage device, another storage device of the plurality of storage devices having another plurality of available single-level cell blocks associated with the policy for handling a substantial change in partition usage; cause, based on the increase in storage operations at the particular storage device, new storage operations to be performed at the another storage device; and report, through the host interface, the new storage operations being caused to be performed at the another storage device. The dynamically selected storage device may be selected from the plurality of storage devices based on the usage value for single-level cell blocks of the selected storage device having the highest number of available single level cell blocks. The host device may be configured to configure a data write mode associated with the dynamically selected storage device to write data at one or more addresses of the plurality of available single level cell blocks. Multi-level cell blocks may include at least two bits per cell. The host device may include: a host processor; a host memory: a storage interface configured to communicate with a host interface of each storage device of the plurality of storage devices; and a storage manager configured to send storage operations to the dynamically selected storage device as the new data written at one or more of the plurality of available single level cell blocks. The host device may be configured to initialize each storage device and the storage manager may be further configured to: establish, responsive to initializing each storage device, a partition usage interface with each storage device; and set, through the partition usage interface, at least one partition usage monitoring parameter selected from a partition usage value, a partition usage threshold value, a partition usage period value, a policy for handling a substantial change in partition usage, a notification type, and a reporting period. The storage device controller may be further configured to: determine, responsive to each storage device being initialized and based on the storage operations sent to the dynamically selected storage device, a current partition usage value for each partition of the dynamically selected storage device; determine at least one of the current partition usage values for the partitions of the dynamically selected storage device meets a partition usage threshold value; dynamically select a second storage device of the plurality of storage devices based on the usage value for single-level cell blocks of the selected second storage device indicating a second plurality of available single level cell blocks; and store the new data at the dynamically selected second storage device of the plurality of storage devices.

Another general aspect includes a computer-implemented method including: processing a plurality of storage operations at a plurality of storage devices from a host device, where each storage device of the plurality of storage devices may include a plurality of partitions including multi-level cell blocks and single-level cell blocks, and multi-level cell blocks are configured to be selectively written in a single-level write operation; determining a usage value for each partition of the plurality of partitions at each storage device of the plurality of storage devices; dynamically selecting a storage device of the plurality of storage devices based on the usage value for single-level cell blocks of the selected storage device indicating a plurality of available single level cell blocks, and storing new data at the dynamically selected storage device of the plurality of storage devices.

Implementations may include one or more of the following features. The usage value is determined from: a number of available single level cell blocks; a number of programmed single level cell blocks; and a total usage value for each partition of each storage device. The computer-implemented method may include: receiving, through a host interface on each storage device, a partition usage value; determining, by each data storage device and based on the partition usage value, a partition usage period; and detecting, by each storage device, an increase in storage operations over the partition usage period. The computer-implemented method may include: receiving, through a host interface on each storage device, a policy for handling a substantial change in partition usage; determining, based on the policy for handling a substantial change in partition usage, a partition usage threshold value; and detecting, by the host device, an increase in storage operations at a particular storage device of the plurality of storage devices corresponding to the partition usage threshold value. The computer-implemented method may include: determining, based on the increase in storage operations at the particular storage device and by the host device, another storage device of the plurality of storage devices having available single-level cell blocks associated with the policy for handling a substantial change in partition usage; causing, based on the increase in storage operations at the particular storage device, new storage operations to be performed at the another storage device; and reporting, through the host interface, the new storage operations being caused to be performed at the another storage device. The dynamically selected storage device may be selected from the plurality of storage devices based on the usage value for single-level cell blocks of the selected storage device having the highest number of available single level cell blocks. The computer-implemented method may include configuring, by the host device, a data write mode associated with the dynamically selected storage device to write data at one or more addresses of the plurality of available single level cell blocks. The host device may include: a host processor; a host memory: a storage interface configured to communicate with a host interface of each storage device of the plurality of storage devices; and a storage manager configured to send storage operations to the dynamically selected storage device as the new data written at one or more of the plurality of available single level cell blocks. The computer-implemented method may include: initializing, by the host device, each storage device; establishing, by the host device and responsive to initializing each storage device, a partition usage interface with each storage device; setting, by the host device and through the partition usage interface, at least one partition usage monitoring parameter selected from a partition usage value, a partition usage threshold value, a partition usage period value, a policy for handling a substantial change in partition usage, a notification type, and a reporting period; determining, responsive to each storage device being initialized and based on the storage operations sent to the dynamically selected storage device, a current partition usage value for each partition of the dynamically selected storage device; determining at least one of the current partition usage values for the partitions of the dynamically selected storage device meets a partition usage threshold value; dynamically selecting a second storage device of the plurality of storage devices based on the usage value for single-level cell blocks of the selected second storage device indicating a second plurality of available single level cell blocks; and storing the new data at the dynamically selected second storage device of the plurality of storage devices.

Still another general aspect includes a system that includes: means for processing a plurality of storage operations at a plurality of storage devices from a host device, where each storage device of the plurality of storage devices may include a plurality of partitions including multi-level cell blocks and single-level cell blocks, and multi-level cell blocks configured to be selectively written in a single-level write operation; means for determining a usage value for each partition of the plurality of partitions at each storage device of the plurality of storage devices; means for dynamically selecting a storage device of the plurality of storage devices based on the usage value for single-level cell blocks of the selected storage device indicating a plurality of available single level cell blocks, and means for storing new data at the dynamically selected storage device of the plurality of storage devices.

The various embodiments advantageously apply the teachings of data storage devices and/or storage systems to improve the functionality of such computer systems. The various embodiments include operations to overcome or at least reduce the issues previously encountered in storage systems and, accordingly, are more configurable and/or reliable than other computing systems. That is, the various embodiments disclosed herein include hardware and/or software with functionality to improve the data storage device endurance and performance, such as by a system using a partition usage interface for selecting a storage device in storage operations. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
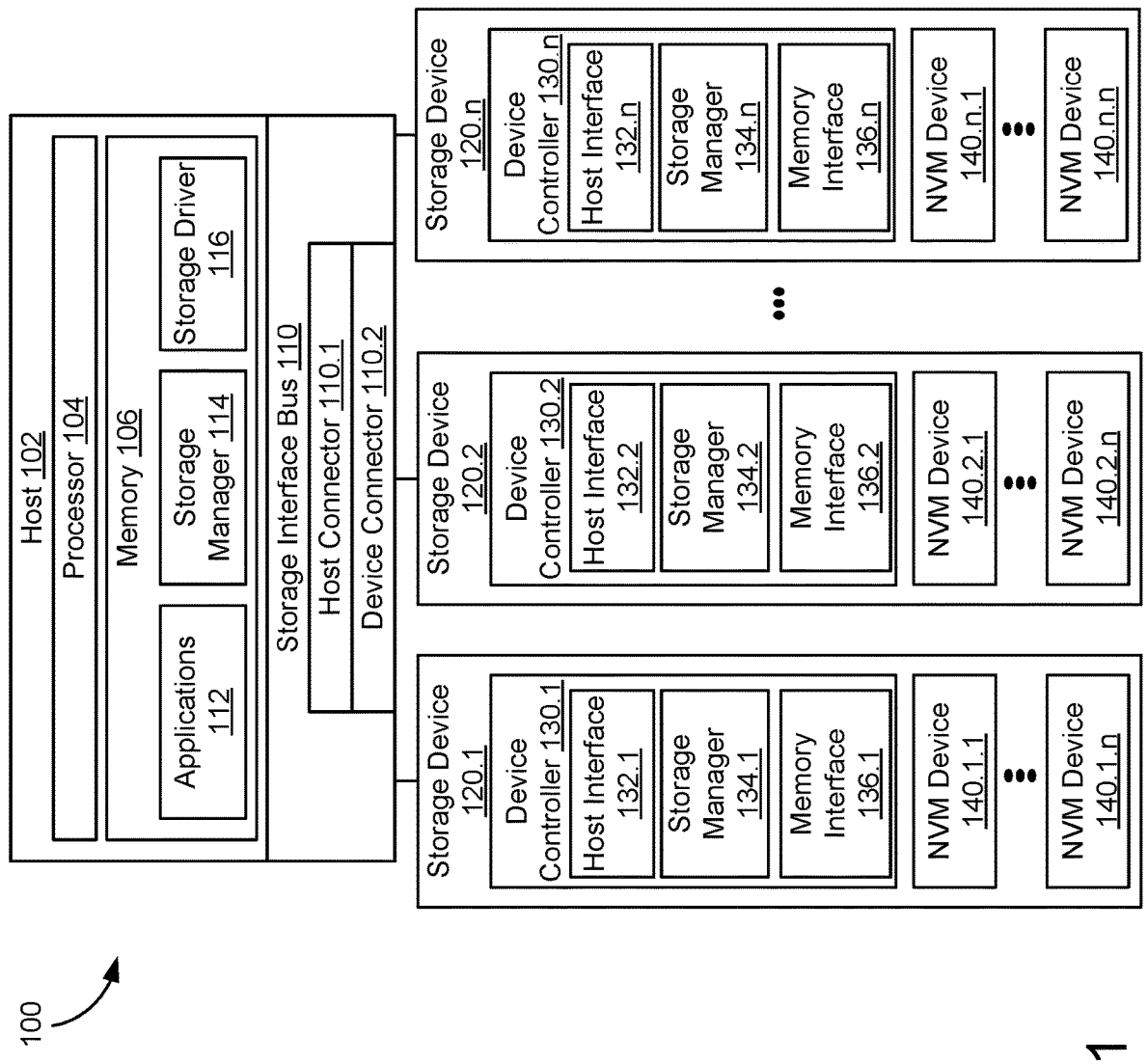
FIG. 1 schematically illustrates a storage system with host device and a plurality of storage devices.

FIG. 1 shows an embodiment of an example data storage system 100 with a data storage device 120 interconnected by a storage interface 110 to host device 102. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, disk drives, or drives) in communication with one or more host devices 102. In some embodiments, host device 102 may be a user device with an embedded computing system, such as video camera, mobile phone, tablet computer, smart television, smart appliance, portable game device, printer, or other consumer electronic device. In some embodiments, storage device 120 may be a removable storage device, such as a universal serial bus (USB) flash drive, secure digital (SD) card, extended capacity (SDXC) SD card, or other removable storage device.

In some embodiments, storage device 120 may be configured in a server or storage array blade or similar storage unit for use in data center storage racks or chassis. Storage device 120 may interface with one or more host devices 102 and provide data storage and retrieval capabilities for or through those host systems. In some embodiments, host device 102 may support one or more client systems or devices configured to access data in or about storage device 120. For example, clients may include one or more applications that access data from storage device 120 through host device 102 and/or through a network or network fabric. In some embodiments, storage device 120 may be configured in a storage hierarchy that includes storage nodes, storage controllers, and/or other intermediate components between storage device 120 and host device 102. For example, each storage controller may be responsible for a corresponding set of storage nodes and their respective storage devices may be connected through a corresponding internal bus architecture including storage interface bus 110 or may be connected through a corresponding backplane network and/or network fabric, though only storage devices 120 and host device 102 are shown.

In the embodiment shown, a number of storage devices 120.1-120.n are attached to a common storage interface bus 110 for host communication with host device 102. For example, storage devices 120 may include a number of drives arranged in a storage array, such as storage devices sharing a common rack, unit, or blade in a data center or the SSDs in an all flash array. As another example, host device 102 may include a host connector 110.1, such as a peripheral component interface express (PCIe) connector, USB slot, memory card slot/reader (for Memory Stick, MultiMedia Card, SD, SDXC, etc. memory cards), etc., that provides a physical connector configured to mate with a corresponding storage device connector 110.2. In some embodiments, host connector 110.1 may define a slot or port providing a wired internal connection to a host bus or storage interface controller. In some embodiments, device connector 110.2 may include a portion of a storage device housing or projection therefrom that removably inserts into the slot or port in host connector 110.1 to provide a physical attachment and electrical connection for host-device communication. In some embodiments, an intervening wire, extender, switch, or similar device compatible with host connector 110.1 and device connector 110.2 may be inserted between host connector 110.1 and device connector 110.2 without materially changing the host-device interface or operation of storage interface 110.

In some embodiments, storage interface bus 110 may be configured to use network communication protocols. Host connector 110.1 and device connector 110.2 may include any type of physical connector compatible with one or more network and/or internet protocols. For example, host connector 110.1 and device connector 110.2 may include ethernet, PCIe, Fibre Channel, small computer serial interface (SCSI), serial attached SCSI (SAS), or another network-capable interface. In some embodiments, storage devices 120 may communicate through a backplane network, network switch(es), and/or other hardware and software components accessed through storage interface bus 110 for reaching host device 102. For example, storage interface bus 110 may include or interconnect with a plurality of physical port connections and intermediate components that define physical, transport, and other logical channels for establishing communication with the different components and subcomponents for establishing a communication channel between host device 102 and storage devices 120. In some embodiments, storage interface 110 may provide a primary host interface for storage device management and host data transfer, as well as a control interface that includes limited connectivity to the host for low-level control functions, such as through a baseboard management controller (BMC).

In some embodiments, data storage devices 120 are, or include, solid-state memory devices. Each data storage device 120 may include a non-volatile memory (NVM) or storage device controller 130 based on compute resources (processor and memory) and a plurality of NVM or media devices 140 for data storage (e.g., one or more NVM device(s), such as one or more flash memory devices). In some embodiments, storage device controller 130 may include a host interface controller 132, a host storage manager 134, and one or more memory interface controllers 136. For example, host interface controller 132 may include a physical subsystem, such as an application specific integrated circuit (ASIC) or system on a chip (SOC), and/or logic or firmware running on the general compute resources of storage device controller 130 for configuring and controlling communication with host device 102 over storage interface bus 110. Host storage manager 134 may include configuration, background, and storage processing operations running on the general compute resources of storage device controller 130 to coordinate operation of storage device 120, host interface 132, and memory interface 136. Memory interface 136 may include a physical memory bus and related resources for connecting to NVM devices 140.1-140.n, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors, such as device connector 110.2, for interconnecting with storage interface bus 110.

In some embodiments, a respective data storage device 120 may include a single medium device while in other embodiments data storage device 120 includes a plurality of media devices. In some embodiments, media devices 140 may include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels, or the like. However, in some embodiments, one or more data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes storage device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controller. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage device 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks. In some configurations, logical and/or physical zones may be assigned within storage device 120 as groups of data blocks allocated for specified host data management purposes.

In some embodiments, host, host system, or host device 102 may be coupled to data storage system 100 through a network interface that is part of host fabric network that includes storage interface 110 as a host fabric interface. In some embodiments, multiple host devices 102 (only one of which is shown in FIG. 1) and/or clients are coupled to data storage system 100 through the fabric network, which may include a storage network interface or other interface capable of supporting communications with multiple host systems. In some embodiments, the fabric network may operate over a wired and/or wireless network (e.g., public and/or private computer networks in any number and/or configuration) which may be coupled in a suitable way for transferring data. For example, the network may include any means of a conventional data communication network such as a local area network (LAN), a wide area network (WAN), a telephone network, such as the public switched telephone network (PSTN), an intranet, the internet, or any other suitable communication network or combination of communication networks.

Host device 102 may be any suitable computer device, such as a computer, a computer server, a laptop computer, a tablet device, a netbook, an internet kiosk, a personal digital assistant, a mobile phone, a smart phone, a gaming device, a smart appliance, a camera or video camera, consumer electronics device, or any other computing device. Host device 102 is sometimes called a host, client, or client system, depending on respective roles, configurations, and contexts. In some embodiments, host device 102 is distinct from a storage controller, storage node, or storage interface component housing or receiving storage device 120. In some embodiments, host device 102 may be any computing device configured to store and access data in storage device 120.

Host device 102 may include one or more central processing units (CPUs) or processors 104 for executing compute operations or instructions for accessing storage devices 120 through storage interface bus 110. In some embodiments, processor 104 may be associated with operating memory 106 for executing both storage operations and a storage interface protocol compatible with storage interface 110 and storage devices 120. In some embodiments, a separate storage interface unit (not shown) may provide the storage interface protocol and related processor and memory resources. From the perspective of each storage device 120, storage interface bus 110 may be referred to as a host interface and provides a host data path between each storage device 120 and host device 102.

Host device 102 may include memory 106 configured to support various data access and management functions, generally in support of one or more applications 112. Memory 106 may include a random access memory (RAM) or another type of dynamic storage device that stores information and instructions for execution by processor 104 and/or a read only memory (ROM) or another type of static storage device that stores static information and instructions for use by processor 104 and/or any suitable storage element such as a hard disk or a solid state storage element. For example, memory 106 may include one or more dynamic random access memory (DRAM) devices for use by host device 102 for command, management parameter, and/or host data storage and transfer to and from storage device 120. In some embodiments, storage devices 120 may be configured for direct memory access (DMA), such as using remote direct memory access (RDMA) protocols, over storage interface 110 to interact with host device 102.

In some embodiments, host device 102 may include one or more applications 112 instantiated in host memory 106 for execution by host processor 104. Applications 112 may include and/or be configured to access one or more storage management functions of storage manager 114. Storage manager 114 may include applications, services, libraries, and/or corresponding interfaces for managing the contents and operation of each storage device 120 on behalf of host device 102. For example, storage manager 114 may include services for monitoring storage device parameters, such as total capacity, capacity used, and capacity available, tracking storage device I/O history, performance, and workload, and initiating host storage maintenance functions, such as media scans, defragmentation, host data transfer or reorganization, etc. In some embodiments, storage manager 114 may configure and monitor storage device alerts and notifications for usage monitoring. For example, storage manager 114 may include a function for monitoring for substantial partition usage change or indicators from each storage device 120 and logic for responding to such notifications or indicators. Storage manager 114 may include and/or be configured to access a storage driver 116 configured to manage communications with each storage device 120 in accordance with a defined storage protocol supported by storage interface bus 110 and host and storage device configuration parameters. In some embodiments, storage driver 116 may be an operating system and/or firmware service or set of services configured to initialize, control, and manage communication through storage interface bus 110 to each storage device 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
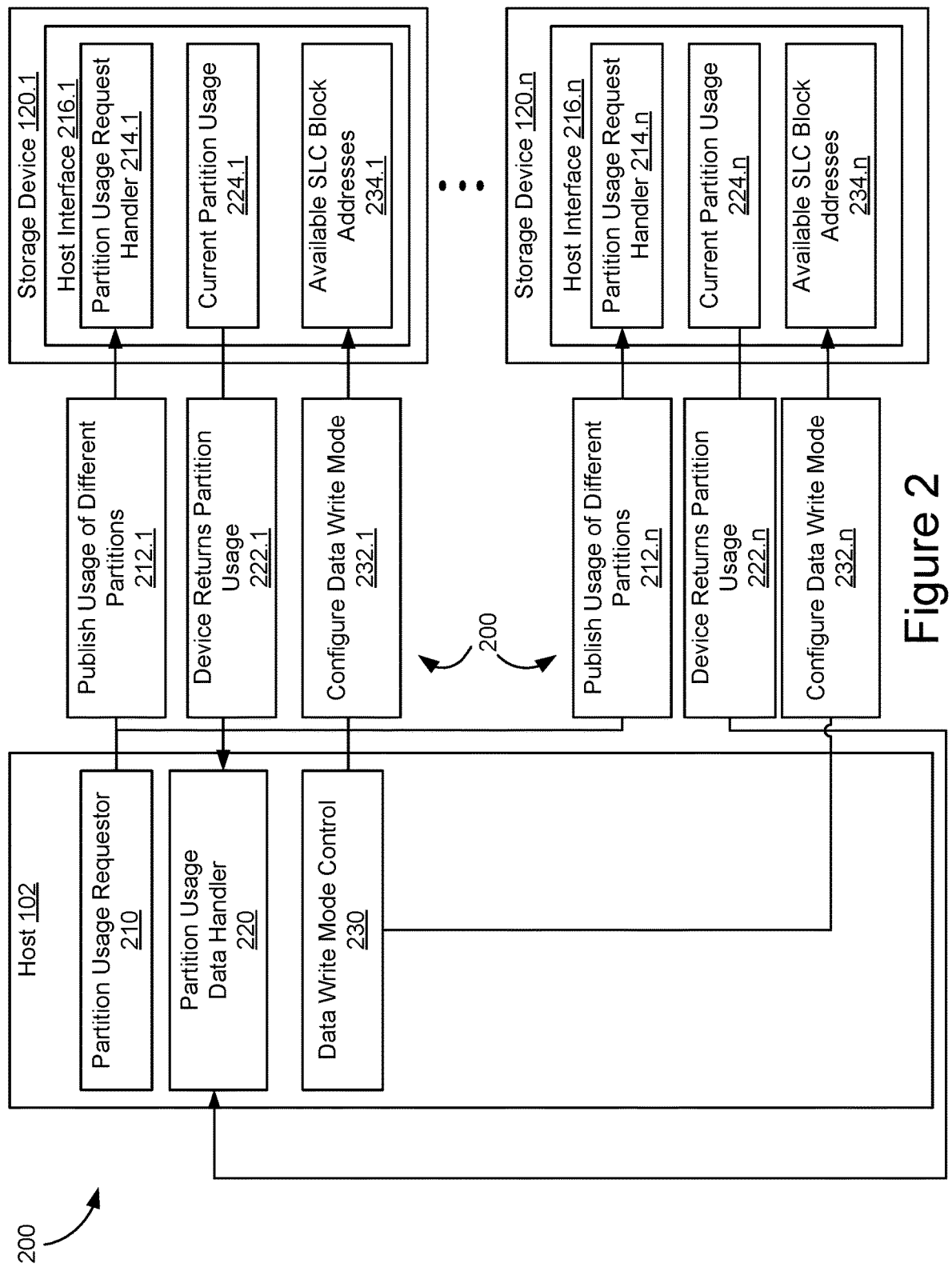
FIG. 2 schematically illustrates an interface for publishing partition usage that may be used by the storage system of FIG. 1.

FIG. 2 shows a schematic representation of a host/storage interface for partition usage indicators that may be used by a storage system 200 configured similarly to storage system 100 of FIG. 1. Host device 102 may be configured for communication with storage devices 120.1-120.n, such as through a storage interface similar to storage interface bus 110 in FIG. 1. In some embodiments, communications 202 may include messages passed between host device 102 and storage device 120. For example, host device 102 and storage devices 120 may support bi-directional packetized communication using a master-slave or multi-master configuration over a communication bus or network connection between them. In some embodiments, communications 202 between host 102 and storage devices 120 may include register-based communication controlled solely by host device 102. For example, the interface between storage device 120 and host device 102 may define a set of memory locations in each storage device 120 that are accessible to host device 102, such as a function register of an SD card interface or a command buffer configured for RDMA access. Host device 102 may read storage device memory locations to receive feature support information and partition usage indicators and write to storage device memory locations to set configuration parameters.

Host device 102 and storage devices 120 may include interface protocols that support a compatible set of functions and parameters within the larger storage interface protocol used for communication between the devices. In some embodiments, interface protocols may include a function or extension defined for an existing storage interface protocol. For example, interface protocols may include mutual support for an extended partition usage monitoring function for SD cards that uses an extension register for function definition, configuration parameters, and partition usage indicators and/or partition usage monitoring parameters, as well as using an existing event notification mechanism, such as a function status bit that indicates to host device 102 that the register should be read.

Host device 102 may include a partition usage requestor 210 that sends an instruction to publish usage of different partitions 212 to the storage devices 120. For example, host device 102 may request each storage device 120 to publish the usage values for the different partitions included in each storage device 120, including a single-level cell (SLC) partition, a single-level cell (SLC) written on an multi-level cell (MLC) partition, and a multi-level cell (MLC) partition. Here, MLC partitions can include memory cells where 2 or more bits of data are stored per cell, such as triple-level cell (TLC) and quad-level cell (QLC) configurations. Responsive to host device 102 sending the instruction to publish usage of the different partitions 212.1 to a storage device 120.1, for example, a partition usage request handler 214.1 may handle the request from the host device 102 and determine the current partition usage values 224.1 for the different partitions. Each storage device 120 includes a host interface 216 that further includes the partition usage request handler 214. Once the storage device 120 determines the current partition usage 224 for the partitions in the storage device 120, the device returns the partition usage 222 to the host device 102. In an embodiment, the host 102 includes a partition usage data handler 220 that receives the partition usage values 222 returned by the storage devices 120.

Once the host device 102 receives the partition usage data from the storage devices 120, a data write mode control 230 may dynamically select which of the storage devices 120 to write data that will beneficially improve endurance and performance. For example, the information exchange of steps 212 and 222 may occur at multiple time periods, including before a host directs a command to one or more storage devices 120 and periodically after the host 102 has directed a certain amount of data to the one or more storage devices 120. Additionally, if a storage device 120 performs internal data movement resulting in a substantial change of SLC, SLC written on MLC, and MLC blocks, the storage device 120 may initiate the information exchange to notify the host device 102 of the substantial change. Once the host device 102 has knowledge of usage of the various types of blocks in all attached storage devices 120, the host device 102 may select a particular storage device 120 of the plurality of storage devices 120.1-120.n based on the availability of SLC blocks and SLC on MLC blocks. In an embodiment, the host 102 includes a data write mode control 230 that performs the dynamic selection of the particular storage device 120 having the lowest usage of SLC blocks (e.g., highest availability) in comparison to the remaining storage devices 120. For example, host device 102 may gather the partition usage data, through the partition usage data handler 220, of the storage devices 120 connected to the host device 102 through the storage interface bus 110. Data write mode control 230 may be configured to send a data write mode configuration instruction 232 to available SLC block addresses 234 in the host interface 216 of the selected storage device 120. For example, data write mode control 230 may configure a data write mode 232.1 for a storage device 120.1 through the host interface 216.1 based on the partition usage value for SLC blocks being the lowest for storage device 120.1 such that new data that is requested for data write is stored at one or more of the available SLC block addresses 234.1 at the storage device 120.1. In this way, the host device 102 beneficially improves the endurance and the performance of the plurality of storage devices 120 by selecting the storage device with the lowest usage of SLC partition. Typically, without the techniques described here, a host device 102 would select the least used storage device 120 without considering partition usage. This would then result in an SLC written on an MLC block to be used, resulting in 1 PEC of the MLC block to be used, further reducing the endurance of the storage device. However, through the technique described here, the host device 102 would select a storage device 120 having the most available SLC block addresses 234, thus improving the endurance and performance of the storage devices 120.

In some embodiments, host device 102 may receive a notification of a substantial change in the partition usage values of a storage device 120. For example, if the storage operations at a particular storage device 120.n suddenly increased, the current partition usage 224.n may be sent to the host device 102 through a notification or other mechanism. As a result, the scheme to increase endurance and performance for that particular storage device 120.n would be disabled such that the data write mode control 230 would remove storage device 120.n from consideration. In another embodiment, one or more logical rules may be evaluated with regard to a substantial partition usage change indicator received by the host device 102 to determine further action by one or more host devices 102. In some embodiments, if the substantial partition usage change indicator meets one or more specified binary thresholds, such as a sudden usage of over 50% of the capacity of the storage device 120, predetermined response actions may be taken, such as providing user notifications or warning indicators to a user interface, disabling the selection of the storage device 120 from the pool of available devices, enabling a graceful exit from a threatened application, etc.

Figure 3:
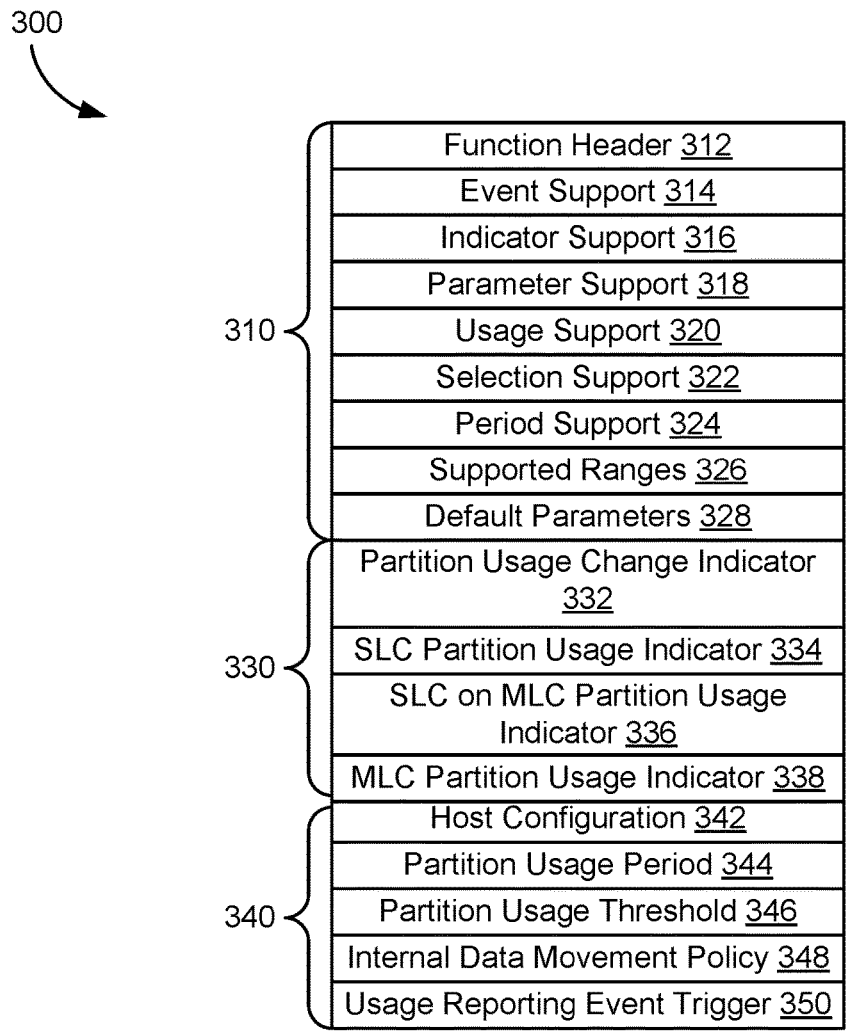
FIG. 3 schematically illustrates a block type usage interface registry that may be used by the storage system of FIG. 1.

FIG. 3 shows a schematic representation of a partition usage interface register 300 that may be used by the storage system 100 of FIG. 1. For example, storage devices 120 may include a set of memory locations configured as a registry allocated for a partition usage monitoring function and accessible to host device 102. In some embodiments, partition usage interface register 300 may include a plurality of fields or parameters for communicating usage related support parameters 310, partition usage indicators 330, and/or configuration parameters 340. Various fields may include different access privileges for one or both devices. For example, support parameters 310 may be read-only fields for describing the partition usage monitoring function, parameters, arguments, and extensions supported by storage device 120. Partition usage indicators 330 may be read/write fields for storage device 120, but read-only for host device 102 to enable each storage device 120 to selectively provide partition usage indicators to host device 102 in indicator memory locations. Configuration parameters 340 may be read/write for host device 102 to enable host device 102 to check current configuration parameter settings and/or set new host configuration parameters, for example, as described above with regard to FIG. 2.

In some embodiments, support parameters 310 may include a plurality of support parameter fields, such as: a function header 312 configured to include values identifying the partition usage function and/or the scope and layout of the register; event support 314 configured to include values identifying an event notification mechanism, sometimes referred to as a notification type, such as setting an event bit elsewhere in the storage interface or leveraging another storage event notification process; indicator support 316 configured to include values identifying the types of partition usage indicators supported by the function; parameter support 318 configured to include values identifying the usage parameters and/or units of those usage parameters supported by the function; usage support 320 configured to include values identifying whether partition usage is supported by the function; selection support 322 configured to include values identifying a selection criteria or incremental thresholds for determining SSD selection based on SLC block availability supported by the function; period support 324 configured to include values identifying whether multiple time periods are supported by the function; supported ranges 326 configured to include values identifying the acceptable range of one or more host-configurable configuration parameters, such as configuration parameters 340, supported by the function; and default parameters 328 configured to include default values for one or more configuration parameters, such as configuration parameters 340, used by the function (absent host device 102 setting host configuration values). For example, each field may be identified by a memory location, such as start position to end position or start position and length, a field or parameter tag, and/or another mechanism for identifying the specific field and its contents. In an alternate embodiment, the plurality of support parameter field values may be provided in a messaging or command/response configuration where host device 102 sends a function definition command and storage device 120 responds with one or more of the fields/values from support parameters 310.

In some embodiments, partition usage indicators 330 may include a plurality of partition usage indicator fields, such as: partition usage change indicator 332 configured to include a usage change flag or similar binary performance change indicator for communicating when a substantial change condition exists; SLC partition usage indicator 334 configured to include values quantifying the amount of available SLC blocks; SLC on MLC partition usage indicator 336 configured to include values quantifying the amount of available SLC on MLC blocks; and MLC partition usage indicator 338 configured to include values quantifying the amount of available MLC blocks. In some embodiments, partition usage indicators 330 may support usage reporting over multiple time periods. For example, partition usage indicators 330 may be provided for additional time periods, such as every minute, 5 minute period, 10 minute period, etc. from the current time until SLC blocks are unavailable. Each field in partition usage indicators 330 may be identified by a memory location, such as start position to end position or start position and length, a field or parameter tag, and/or another mechanism for identifying the specific field and its contents. In an alternate embodiment, the plurality of partition usage field values may be provided in a messaging or notification configuration where storage device 120 generates event-based or periodic notification messages to host device 102 containing one or more of the fields/values from partition usage indicators 330.

In some embodiments, configuration parameters 340 may include a plurality of host configuration parameter fields, such as: host configuration 342 configured to include values identifying a particular host configuration, such as a host device identifier and/or a configuration identifier corresponding to specific host access patters, commands, and/or use cases; partition usage period 344 configured to include one or more partition usage period values; partition usage threshold 346 configured to include one or more partition usage threshold values, such as usage threshold values defining a substantial partition usage change; internal data movement policy 348 configured to define internal data movement from an SLC block or an SLC on MLC block to and MLC block during idle time; and a usage reporting event trigger 350 configured to trigger one or more usage reporting events based on one or more of the partition usage threshold values being met. Each field in configuration parameters 340 may be identified by a memory location, such as start position to end position or start position and length, a field or parameter tag, and/or another mechanism for identifying the specific field and its contents. In an alternate embodiment, the plurality of host configuration field values may be provided in a messaging or command/response configuration where host device 102 sends a configuration set command and storage device 120 responds with a confirmation message.

Figure 4:
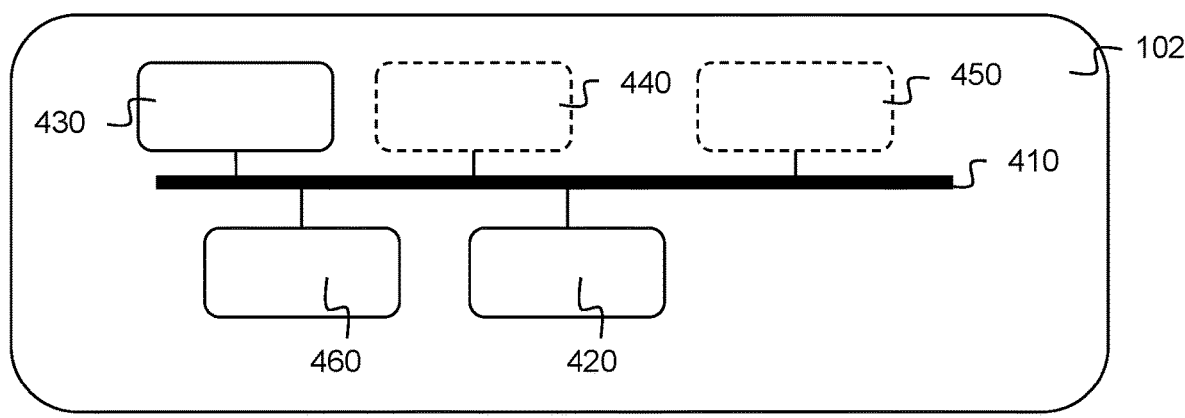
FIG. 4 schematically illustrates a host device of the storage system of FIG. 1.

FIG. 4 shows a schematic representation of an example host device 102. Host device 102 may comprise a bus 410, a host processor 420, a host memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Host memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. For example, partition usage requestor 210, partition usage data handler 220, and/or data write mode control 230 in FIG. 2 may be instantiated in instructions, operations, or firmware stored in host memory 430 for execution by host processor 420. An optional input unit 440 may include one or more conventional mechanisms that permit an operator to input information to host 102 such as a keyboard, a mouse, a pen, voice recognition and/or biometric mechanisms, etc. In some embodiments, optional input unit 440 may include image, audio, infrared, and/or other sensors for video camera or other consumer electronics functions. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe, USB, SD, SDXC, or other interface for connecting to storage device 120 and/or a network interface for communicating with storage device 120 over a fabric network.

Figure 5:
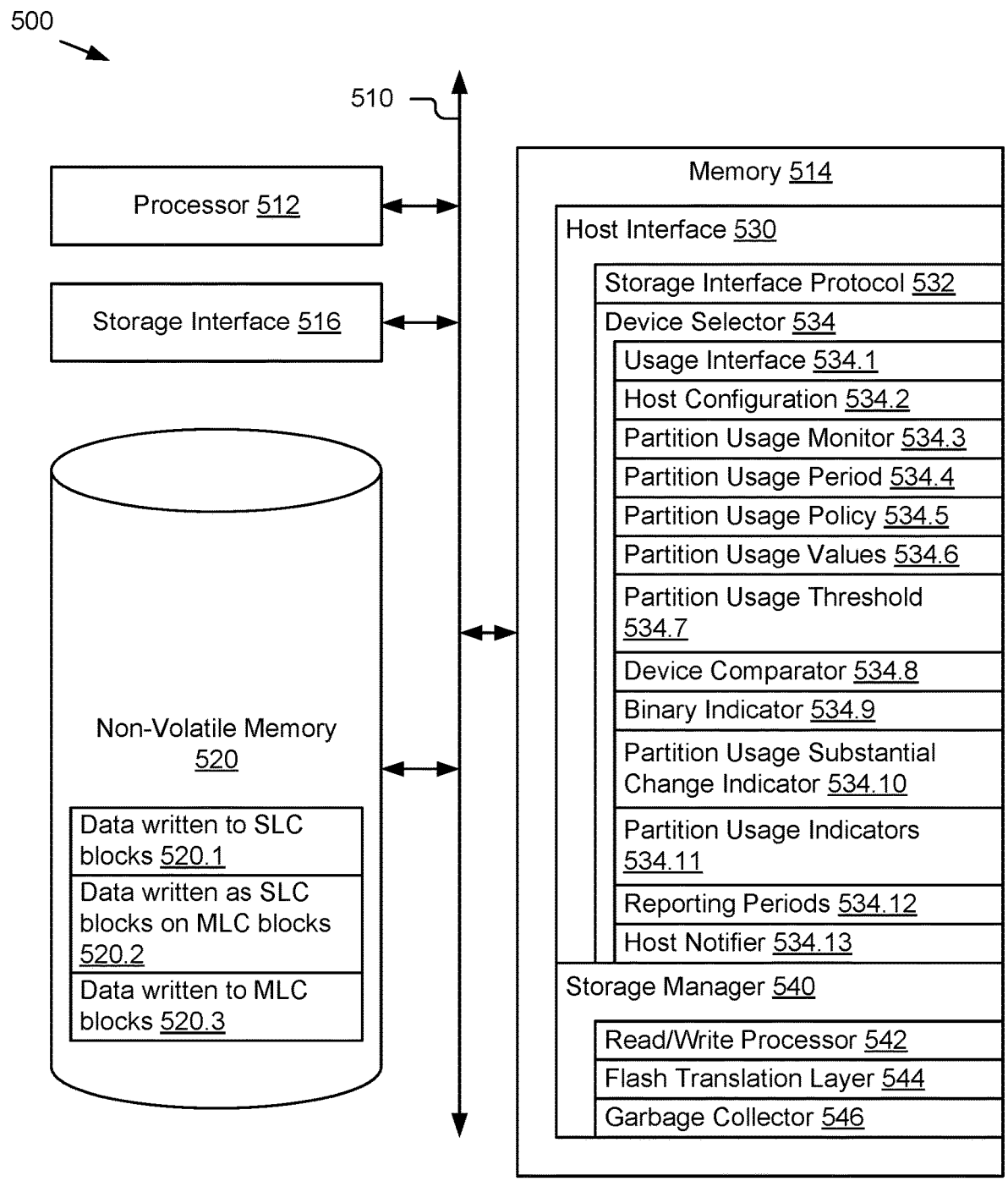
FIG. 5 schematically illustrates some elements of the storage system of FIG. 1-4 in more detail.

FIG. 5 schematically shows selected modules of a storage device 500 configured for selectively storing host data as SLC blocks, SLC blocks written on MLC blocks, and MLC blocks. Storage device 500 may incorporate elements and configurations similar to those shown in FIGS. 1-3. For example, storage device 500 may be a storage device configured as a storage device 120 in storage system 100, where the storage device includes: bus 510, processor 512, memory 514 (instantiating host interface 530 and storage manager 536), and storage interface 516 in storage device controller 130; and non-volatile memory 520 in NVM devices 140.

Storage device 500 may include a bus 510 interconnecting at least one processor 512, at least one memory 514, and at least one interface, such as storage interface 516. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage interface 516 may include a physical interface for communication between a storage device and a host or client using an interface protocol that supports storage device access. For example, storage interface 516 may include a USB, SD, SDXC, PCIe, serial advanced technology attachment (SATA), serial attached small computer system interface (SCSI) (SAS), or similar storage interface connector supporting access to solid state media comprising non-volatile memory devices 520. In some embodiments, storage interface 516 may connect to or incorporate a network interface for connecting to a fabric network and/or other network. For example, storage interface 516 may connect to a network fabric interface through a backplane network and/or storage network interface controller supporting an NVMe-over-fabric (NVMeoF) protocol. In some embodiments, storage device 500, hosts, clients, and/or other components of the storage system may be configured as nodes in the NVMeoF topology and communicate using supported NVMe commands, such as NVMe telemetry commands.

Storage device 500 may include one or more non-volatile memory devices 520 configured to store data written to SLC blocks 520.1, data written as SLC blocks on MLC blocks 520.2, and data written to MLC blocks 520.3. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cells (MLC), triple-level cells (TLC), quad-level cells (QLC), penta-level cells (PLC), etc. In some embodiments, non-volatile memory devices 520 may include the storage medium of a storage device, such as NVM devices 140 in storage devices 120.

Storage device 500 may include a plurality of modules or subsystems that are stored and/or instantiated in memory 514 for execution by processor 512 as instructions or operations. For example, memory 514 may include a host interface 530 configured to receive, process, and respond to host data requests and/or management commands from client or host systems. Memory 514 may include storage manager 540 configured to manage storage and management operations to the media devices comprising non-volatile memory 520.

Host interface 530 may include an interface protocol and/or set of functions, parameters, and/or data structures for receiving, parsing, responding to, and otherwise managing host data requests from a host. For example, host interface 530 may include functions for receiving and processing host requests for reading, writing, modifying, or otherwise manipulating data blocks and their respective client or host data and/or metadata in accordance with host communication and storage protocols. Host interface 530 may also support administrative commands and/or management operations initiated by the host or the storage device, such as configuration changes, garbage collection, log access, firmware management, reporting of operational parameters, notification of predicted performance change indicators, etc. For example, host interface 530 may support administrative command sets for configuring namespaces, queue control, log access, feature identification and configuration, security settings, and/or performance monitoring. In some embodiments, host interface 530 may enable direct memory access and/or access over NVMe protocols through storage interface 516. For example, host interface 530 may include host communication protocols compatible with USB, SD, SDXC, PCIe, SATA, SAS, and/or another bus interface. Host interface 530 may further include performance interface protocols compatible with configuring and enabling predicting and reporting performance changes based on maintenance operations. For example, host interface 530 may collect relevant operating parameters, determine partition usage values, compare the partition usage values against one or more partition usage thresholds, and report substantial partition usage change indicators from storage device 500 on a periodic, event-based, or host-response basis.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage interface 516. For example, storage interface protocol 532 may include USB, SD, SDXC, PCIe, NVMe, and/or other protocol compliant communication, command, and syntax functions, procedures, and data structures. In some embodiments, host interface 530 may include a device selector 534 configured to provide functions processing and interfaces for dynamically selecting a storage device based on partition usage. In some embodiments, host interface 530 may include additional modules (not shown) for input/output (I/O) commands, buffer management, storage device configuration and management, and other host-side functions.

In some embodiments, device selector 534 may be configured to handle partition usage monitoring to dynamically select a storage device for storage operations processing to improve endurance and performance. Device selector 534 may be comprised of a plurality of interfaces, functions, parameters, data structures, and related logic for executing or supporting one or more functional aspects of device selector 534. For example, device selector 534 may include usage interface 534.1, host configuration 534.2, partition usage monitor 534.3, partition usage period 534.4, partition usage policy 534.5, partition usage values 534.6, partition usage threshold value 534.7, device comparator 534.8, binary indicator 534.9, partition usage substantial change indicator 534.10, partition usage indicators 534.11, reporting periods 534.12, and host notifier 534.13. Not all embodiments will include all partition usage monitoring features or functions.

Usage interface 534.1 may include one or more interfaces configured for communication with a host device regarding device selector capabilities, configuration, and access to the partition usage indicators generated by device selector 534. For example, usage interface 534.1 may be configured using an interface protocol, registry, and/or message structure similar to those described above with regard to FIGS. 2 and 3. In some embodiments, usage interface 534.1 may enable host configuration 534.2. Host configuration 534.2 may include one or more host-configurable parameters that may include default values and/or be set by host interactions through usage interface 534.1. For example, host configuration 534.2 may include a plurality of host configuration values set by the host device as described above with regarding to FIGS. 2 and 3.

Partition usage monitor 534.3 may include one or more interfaces or functions for collecting or accessing operating parameters regarding the processing of host storage operations, such as read, write, and delete commands. For example, partition usage monitor 534.3 may access registers or data structures within or maintained by storage manager 540 to aggregate storage operations data, such as number, type, size, timing, processing resources, etc. of executed storage operations. In some embodiments, partition usage monitor 534.3 may be configured to collect partition usage data for each partition in the storage device 500, such as number of programmed (e.g., used) and/or available blocks in a SLC partition, a SLC written on MLC partition, and an MLC partition.

In some embodiments, partition usage period 534.4 may include one or more partition usage period parameters for determining an operating period during which operating data from partition usage monitor 534.3 may be aggregated for a partition usage calculation. For example, a default or host-configured partition usage period value may determine that operating data be collected for 30 seconds before initiating a partition usage calculation. In some embodiments, the partition usage period may determine how often the partition usage is calculated, such as for time periods equal to the partition usage period. Partition usage values 534.6 may include one or more storage operation partition usage values, such as a number of available blocks in a block type partition that may be used to determine whether partition usage values 534.6 will be within the partition usage expectations or needs of the host device.

Partition usage values 534.6 may be compared against one or more partition usage thresholds 534.7 by device comparator 534.8. Partition usage values 534.6 may include values corresponding to the counted number of available blocks in each partition of the storage device 500 during the partition usage period 534.4. Partition usage thresholds 534.7 may include parameter values corresponding to default and/or host-configured storage operation processing requirements. For example, partition usage thresholds 534.7 may include one or more notification or substantial partition usage change thresholds based on storage operation volumes or throughput requirements of one or more host applications. Device comparator 534.8 may include functions or logic for comparing one or more partition usage values 534.6 to one or more partition usage thresholds 534.7 to determine when the partition usage value crosses a partition usage threshold for generation of a partition usage change indicator, such as binary indicator 534.9, partition usage substantial change indicator 534.10, and/or partition usage indicators 534.11.

Partition usage change indicators may include parameters exposed to or send to the host device to indicate that at least one partition usage change meeting partition usage threshold 534.7 has been determined. For example, device selector 534 may write a partition usage change indicator to an interface register and/or include it in a notification message to the host device. Binary indicator 534.9 may include a flag or similar indicator value that indicates whether a partition usage change condition exists or does not exist. In some embodiments, binary indicator 534.9 may be associated with the partition usage condition at one or more time periods and/or include partition usage value 534.6 that triggered the partition usage change indicator. Partition usage substantial change indicator 534.10 may include a plurality of indicator values corresponding to different substantial partition usage change conditions. For example, different substantial partition usage change conditions may be defined based on a series of threshold values, such as 80% capacity, 60% capacity, and 40% capacity (from the nominal maximum storage capacity value of the storage device). Partition usage indicators 534.11 may include indicator values associated with partition usage values 534.6. For example, partition usage indicators 534.11 may indicate the percentage of blocks used for the partition, such as 100% of SLC partition used.

In some embodiments, device selector 534 may include reporting periods 534.12 configured to determine the frequency with which partition usage values 534.6 are calculated and selectively reported through usage interface 534.1. Reporting periods 534.12 may include parameters and logic for determining the period between calculations, threshold evaluations, and reporting of partition usage changes. For example, reporting periods 534.12 may equal partition usage period 534.4 and/or another periodic value, generally greater than partition usage period 534.4. In some embodiments, device selector 534 may be configured to report partition usage change indicators based on reporting periods 534.12 without determining that partition usage changes will cross partition usage threshold 534.7. Host notifier 534.13 may include interfaces, functions, parameters and logic for notifying the host device of a partition usage change. For example, host notifier 534.13 may trigger an event notification, such as an event notification register or event notification message supported by storage interface protocol 532.

Storage manager 540 may include an interface protocol and/or set of functions, parameters, and data structures for reading, writing, and deleting data units in non-volatile memory devices 520. For example, storage manager 540 may include a read/write processor for executing host data operations related to host storage commands received through host interface 530. For example, PUT or write commands may be configured to write host data units to non-volatile memory devices 520 through a write processor. GET or read commands may be configured to read data from non-volatile memory devices 520 through a read processor. DELETE commands may be configured to delete data from non-volatile memory devices 520, or at least mark a data location for deletion until a future garbage collection or similar operation actually deletes the data or reallocates the physical storage location to another purpose. In some embodiments, storage manager 540 may include flash translation layer (FTL) management 544, data state machine, read/write buffer management, NVM device interface protocols, NVM device configuration/management/maintenance, and other device-side functions. Storage manager 540 may include a garbage collector 546 configured to consolidate valid data units into new programming blocks to enable invalid data units to be erased and allow their programming blocks to be reused. For example, garbage collector 546 may include logic for selecting programming blocks to be collected based on various data parameters, such as data age, valid fragment count, available capacity, etc., and may determine or access data and operating parameters related to such logic. In some embodiments, garbage collector 546 may include progressive logic that becomes more aggressive in reclaiming programming blocks as the number of available programming blocks decreases. Storage manager 540 may include various functions that generate operational parameters, such as workload data, error rates, configuration parameters, physical parameters, storage parameters (e.g., aggregate storage space used/available/marked for garbage collection, wear leveling statistics, etc.), error logs, event logs, and other operational parameters that may be aggregated and reported through various interfaces, functions, or services.

Figure 6:
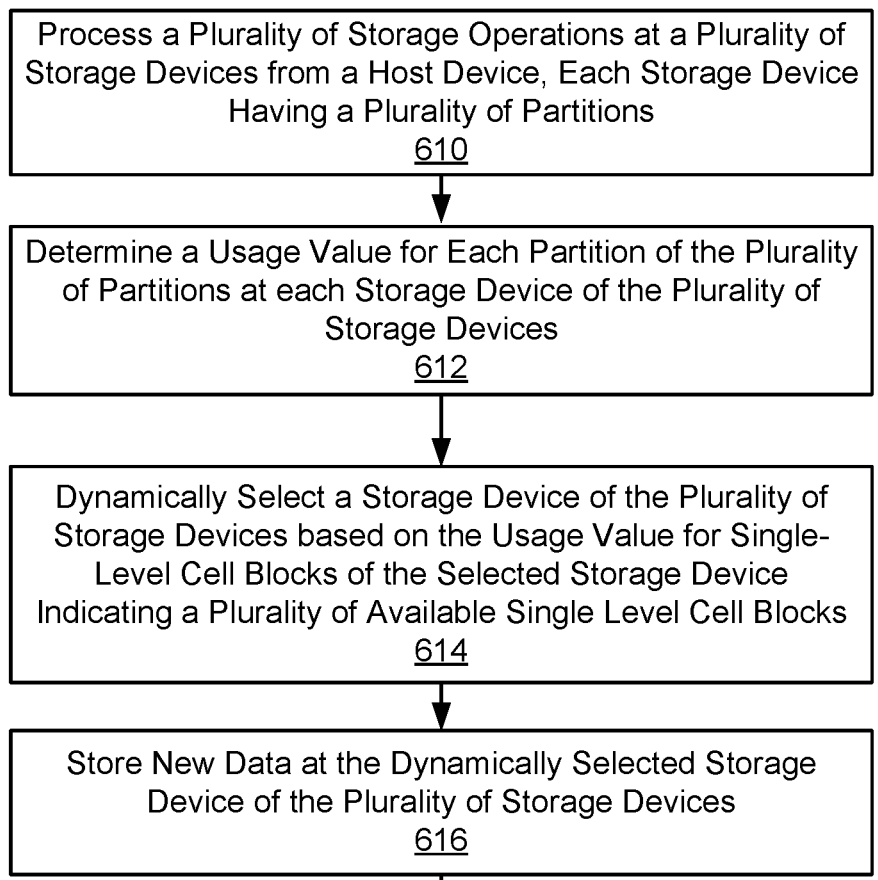
FIG. 6 is a flowchart of an example method of dynamically selecting a storage device based on its partition usage.

As shown in FIG. 6, storage device 500 may be operated according to an example method for dynamically selecting a storage device based on its partition usage, i.e. according to method 600 illustrated by blocks 610-616 in FIG. 6.

At block 610, a plurality of storage operations at a plurality of storage device may be processed from a host device, each storage device having a plurality of partitions. For example, a host interface may receive read, write, and delete commands from the host device to manipulate host data stored by each storage device. The host interface may parse storage commands and generate storage processing tasks executed by a storage manager against the non-volatile media of each storage device. The plurality of partitions of each storage device include multi-level cell blocks and single-level cell blocks where multi-level cell blocks may be selectively written in a single-level write operation.

At block 612, a usage value is determined for each partition of the plurality of partitions at each storage device of the plurality of storage devices. For example, a partition usage monitor may be configured to determine a usage value for each partition by counting the number of programmed (e.g., used) or available blocks in the partition.

At block 614, a storage device of the plurality of storage devices may be dynamically selected based on the usage value for single-level cell blocks of the selected storage device indicating a plurality of available single level cell blocks. For example, a device comparator may be configured to compare the numbers of available single level cell blocks of all the storage devices and dynamically select a storage device based on the usage value for single-level cell blocks. In an embodiment, the storage device with the highest number of available single-level cell blocks may be dynamically selected. In another embodiment, the storage device with the usage value for single-level cell blocks indicating a plurality of available single-level cell blocks is dynamically selected.

At block 616, new data is stored at the dynamically selected storage device of the plurality of storage devices. For example, the device selector may identify the block addresses of the available single-level cell blocks and cause new data to be stored at the selected storage device at the available single-level cell blocks.

Figure 7:
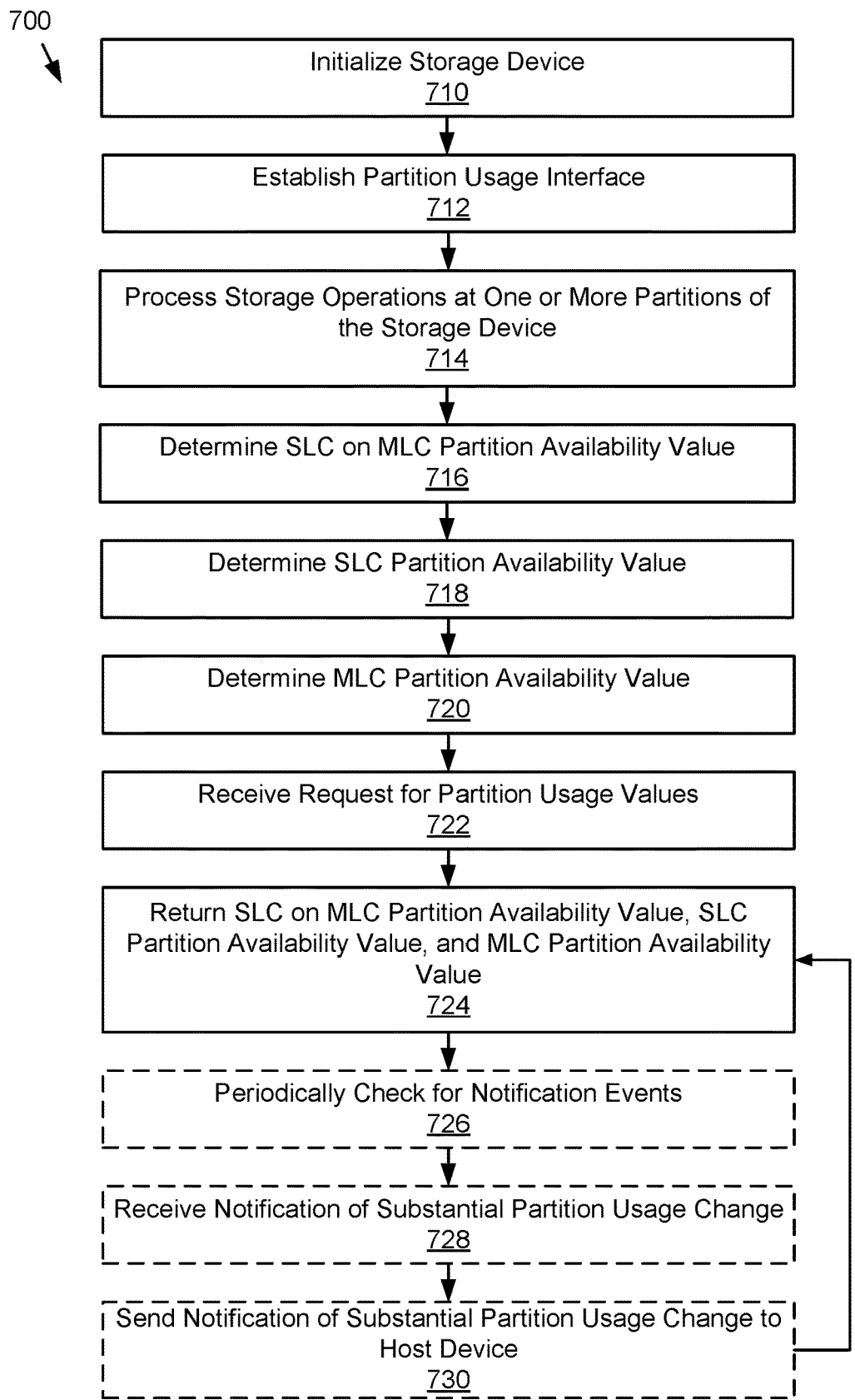
FIG. 7 is a flowchart of an example method of requesting partition usage by a host device.

As shown in FIG. 7, storage system 200 may be operated according to an example method for requesting partition usage by host device 102, i.e. according to method 700 illustrated by blocks 710-730 in FIG. 7.

At block 710, a storage device may be initialized. For example, the host device may initialize a removable storage device through a storage interface to initiate communication with the storage device.

At block 712, a partition usage interface may be established with the storage device. For example, the storage interface may support an embedded partition usage interface as a set of interface registers, functions, and/or commands for configuring partition usage operations and notifications.

At block 714, storage operations at one or more partitions of the storage device may be processed. For example, the partition usage interface may support a plurality of storage operations at one or more partitions of the storage device to be processed.

At block 716, an availability value for an SLC on MLC partition may be determined. For example, the partition usage interface may include a partition usage request handler that determines an availability value for an SLC on MLC partition based on the current partition usage value for the SLC on MLC partition.

At block 718, an availability value for an SLC partition may be determined. For example, the partition usage interface may include a partition usage request handler that determines an availability value for an SLC partition based on the current partition usage value for the SLC partition.

At block 720, an availability value for an MLC partition may be determined. For example, the partition usage interface may include a partition usage request handler that determines an availability value for an MLC partition based on the current partition usage value for the MLC partition.

At block 722, a request for partition usage values may be received. For example, the partition usage interface may support a request for partition usage values, such as current partition usage values as determined by the partition usage monitor.

At block 724, an availability value for an SLC on MLC partition, an availability value for an SLC partition, and an availability value for an MLC partition may be returned. For example, the partition usage interface may support returning availability values of the different partitions at the storage device based on the current partition usage values.

Optionally at block 726, as indicated by the dashed lines of block 726, notification events may be periodically checked. For example, the storage device may be configured for passive notification and the host device may initiate a read operation against an event flag, event log, or similar interface structure to determine that a performance change has been predicted.

Optionally at block 728, as indicated by the dashed lines of block 728, notification of a substantial partition usage change may be received. For example, the event flag may indicate that the partition usage interface register should be read to receive the partition usage substantial change indicator associated with the notification event or the host device may request and receive a notification message containing the partition usage substantial change indicator.

Optionally at block 730, as indicated by the dashed lines of block 730, a notification of substantial partition usage change is sent to the host device. For example, the host device may include logic for responding to the partition usage substantial change indicator and generating a notification of the substantial change in partition usage. As a result of the notification, the method 700 may execute block 724 and return an availability value for the SLC on MLC partition, an availability value for the SLC partition, and an availability value for the MLC partition.

Figure 8:
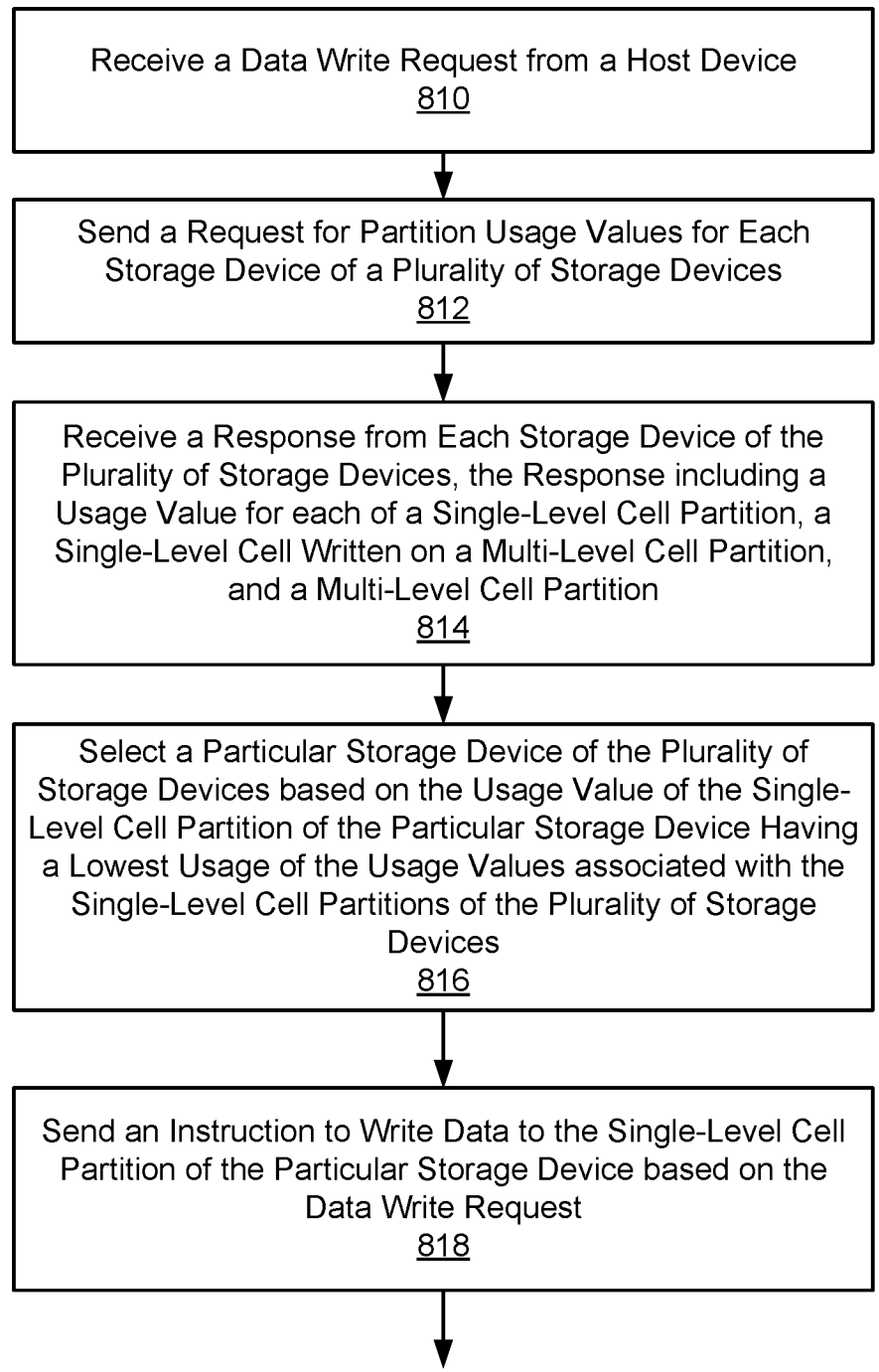
FIG. 8 is a flowchart of an example method of writing data to a storage device selected from a plurality of storage devices based on partition usage.

As shown in FIG. 8, storage device 500 may be operated according to an example method for writing data to a storage device selected from a plurality of storage devices based on partition usage, i.e. according to method 800 illustrated by blocks 810-818 in FIG. 8. In some embodiments, one or more blocks of method 800 may be used in conjunction with method 600 in FIG. 6.

At block 810, a data write request may be received from a host device. For example, a storage manager may receive a data write request through a processor on the host device.

At block 812, a request for partition usage values for each storage device of a plurality of storage devices is sent. For example, the host device may include a partition usage requestor that sends the request for partition usage values for each storage device of a plurality of storage devices.

At block 814, a response from each storage device of the plurality of storage devices may be received, the response including a usage value for each of a single-level cell partition, a single-level cell written on a multi-level cell partition, and a multi-level cell partition. For example, each storage device of the plurality of storage devices may return a current usage value for each of a single-level cell partition, a single-level cell written on a multi-level cell partition, and a multi-level cell partition.

At block 816, a particular storage device of the plurality of storage devices is selected based on the usage value of the single-level cell partition of the particular storage device having a lowest usage of the usage values associated with the single-level cell partitions of the plurality of storage devices. For example, a device selector may use a device comparator to identify the particular storage device having a lowest usage value of the usage values associated with the single-level cell partitions.

At block 818, an instruction to write data to the single-level cell partition of the particular storage device may be sent based on the data write request. For example, the storage manager on the host device may send the instruction to write data to the single-level cell partition of the particular storage device based on the data write request.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system comprising:
at least one host processor configured to, alone or in combination:
process a plurality of storage operations at a plurality of storage devices, wherein:
each storage device of the plurality of storage devices comprises a host interface configured to receive host data requests for a plurality of partitions in that storage device;
each partition of the plurality of partitions comprises at least one memory device of a type selected from:
a multi-level cell memory device; and
a single-level cell memory device;
single-level cell memory devices are configured to be written in a single-level erase block for each single-level cell block; and
multi-level memory devices are configured to be selectively written in a write operation selected from:
a multi-level erase block for each multi-level cell block; and
a single-level erase block for each multi-level cell block that writes to a single level of that multi-level memory device;
receive, from each storage device of the plurality of storage devices and through the host interface of that storage device, a usage value for single-level cell memory devices of that storage device;
dynamically select a storage device of the plurality of storage devices based on the usage value for single-level cell memory devices of the selected storage device indicating a plurality of available single-level cell memory devices; and
store new data at the selected storage device of the plurality of storage devices for an operating period, wherein the dynamically selected storage device is configured to store new data in excess of the plurality of available single-level cell memory devices received during the operating period as single-level erase blocks in multi-level cell memory devices.

2. The system of claim 1, wherein the usage value is determined from a set of indicators provided through the host interface and including:
a single-level cell memory device partition usage indicator;
a single-level cell blocks written to multi-level cell memory devices partition usage indicator; and
a multi-level cell memory device partition usage indicator.

3. The system of claim 1, wherein the at least one host processor is further configured to, alone or in combination:
determine, based on the usage value, a partition usage period for single-level cell memory devices of the selected storage device; and
detect an increase in storage operations over the partition usage period.

4. The system of claim 1, wherein the at least one host processor is further configured to, alone or in combination:
set, through the host interface of the selected storage device, a partition usage threshold value; and
receive, through the host interface of the selected storage device, a notification responsive to the selected storage device detecting an increase in storage operations corresponding to the partition usage threshold value.

5. The system of claim 4, wherein the at least one host processor is further configured to, alone or in combination:
determine, based on the increase in storage operations at the selected storage device, another storage device of the plurality of storage devices having another plurality of available single-level cell memory devices; and
cause, based on the increase in storage operations at the selected storage device, new storage operations to be performed at the another storage device during the operating period.

6. The system of claim 1, wherein the dynamically selected storage device is selected from the plurality of storage devices based on the usage value for single-level cell memory devices of the selected storage device having a highest number of available single-level cell memory devices.

7. The system of claim 1, wherein the at least one host processor is further configured to, alone or in combination, configure a data write mode associated with the selected storage device to write data at one or more addresses of the plurality of available single-level cell memory devices.

8. The system of claim 1, wherein multi-level cell blocks comprise at least two bits per cell.

9. The system of claim 1, wherein the at least one host processor is further configured to, alone or in combination:
set, through the host interface of the selected storage device, an internal data movement policy;
set, through the host interface of the selected storage device, a usage reporting event trigger; and
receive, responsive to internal data movement in the selected storage device resulting in a change in usage values, a notification of the change in usage values responsive to the usage reporting event trigger.

10. The system of claim 1, wherein the at least one host processor is further configured to, alone or in combination:
initialize each storage device of the plurality of storage devices;
establish, responsive to initializing each storage device, a partition usage interface through the host interface of each storage device;
set, through the partition usage interface, at least one partition usage monitoring parameter selected from:
a partition usage value;
a partition usage threshold value;
a partition usage period value;
a policy for handling a substantial change in partition usage;
a notification type; and
a reporting period;
determine, responsive to each storage device being initialized and based on the storage operations sent to the selected storage device, a current partition usage value for each partition of the selected storage device;
determine that at least one of the current partition usage values for the partitions of the selected storage device meets a partition usage threshold value;
dynamically select a second storage device of the plurality of storage devices based on the usage value for single-level cell memory devices of the selected second storage device indicating a second plurality of available single-level cell memory devices; and
store additional new data at the selected second storage device during a next operating period.

11. A computer-implemented method, comprising:
processing, by a host device, a plurality of storage operations at a plurality of storage devices, wherein:
each storage device of the plurality of storage devices comprises a host interface configured to receive host data requests for a plurality of partitions in that storage device;
each partition of the plurality of partitions comprises at least one memory device of a type selected from:
a multi-level cell memory device; and
a single-level cell memory device;
single-level cell memory devices are configured to be written in a single-level erase block for each single-level cell block; and
multi-level memory devices are configured to be selectively written in a write operation selected from:
a multi-level erase block for each multi-level cell block; and
a single-level erase block for each multi-level cell block that writes to a single level of that multi-level memory device;
receiving, from each storage device of the plurality of storage devices and through the host interface of that storage device, a usage value for single-level cell memory devices of that storage device;
dynamically selecting a storage device of the plurality of storage devices based on the usage value for single-level cell memory devices of the selected storage device indicating a plurality of available single-level cell memory devices; and
storing new data at the selected storage device of the plurality of storage devices for an operating period, wherein new data in excess of the plurality of available single-level cell memory devices received during the operating period is stored as single-level erase blocks in multi-level cell memory devices.

12. The computer-implemented method of claim 11, wherein the usage value is determined from a set of indicators provided through the host interface and including:
a single-level cell memory device partition usage indicator;
a single-level cell blocks written to multi-level cell memory devices partition usage indicator; and
a multi-level cell memory device partition usage indicator.

13. The computer-implemented method of claim 11, further comprising:
receiving, by the selected storage device and from the host device, a partition usage period for single-level cell memory devices of the selected storage device; and
detecting, by the selected storage device, an increase in storage operations over the partition usage period.

14. The computer-implemented method of claim 11, further comprising:
setting, by the host device and through the host interface of the selected storage device, a partition usage threshold value; and
receiving, through the host interface of the selected storage device, a notification responsive to the selected storage device detecting an increase in storage operations corresponding to the partition usage threshold value.

15. The computer-implemented method of claim 14, further comprising:
determining, based on the increase in storage operations at the selected storage device and by the host device, another storage device of the plurality of storage devices having available single-level cell memory devices; and
causing, based on the increase in storage operations at the selected storage device, new storage operations to be performed at the another storage device.

16. The computer-implemented method of claim 11, wherein the selected storage device is selected from the plurality of storage devices based on the usage value for single-level cell memory devices of the selected storage device having a highest number of available single-level cell memory devices.

17. The computer-implemented method of claim 11, further comprising:
configuring, by the host device, a data write mode associated with the selected storage device to write data at one or more addresses of the plurality of available single-level cell memory devices.

18. The computer-implemented method of claim 11, further comprising:
setting, through the host interface of the selected storage device, an internal data movement policy;
setting, through the host interface of the selected storage device, a usage reporting event trigger; and
receiving, responsive to internal data movement in the selected storage device resulting in a change in usage values, a notification of the change in usage values responsive to the usage reporting event trigger.

19. The computer-implemented method of claim 18, further comprising:
initializing, by the host device, each storage device of the plurality of storage devices;
establishing, by the host device and responsive to initializing each storage device, a partition usage interface through the host interface of each storage device;
setting, by the host device and through the partition usage interface, at least one partition usage monitoring parameter selected from:
a partition usage value;
a partition usage threshold value;
a partition usage period value;
a policy for handling a substantial change in partition usage;
a notification type; and
a reporting period;
determining, responsive to each storage device being initialized and based on the storage operations sent to the selected storage device, a current partition usage value for each partition of the selected storage device;
determining that at least one of the current partition usage values for the partitions of the selected storage device meets a partition usage threshold value;
dynamically selecting a second storage device of the plurality of storage devices based on the usage value for single-level cell memory devices of the selected second storage device indicating a second plurality of available single level cell memory devices; and storing additional new data at the selected second storage device for a next operating period.

20. A data storage device, comprising:

a non-volatile storage medium comprised of a plurality of partitions, wherein:

each partition of the plurality of partitions comprises at least one memory device of a type selected from:
a multi-level cell memory device; and
a single-level cell memory device;

single-level cell memory devices are configured to be written in a single-level erase block for each single-level cell block; and multi-level memory devices are configured to be selectively written in a write operation selected from:
a multi-level erase block for each multi-level cell block; and
a single-level erase block for each multi-level cell block that writes to a single level of that multi-level memory device;

a host interface configured to receive host data requests from a host device and comprising a partition usage interface;

means for determining at least one usage value for each partition of the plurality of partitions, including a usage value for single-level cell memory devices;

means for reporting, through the partition usage interface and to the host device, the usage value for single-level cell memory devices indicating a plurality of available single-level cell blocks; and means for storing new data from the host device to the non-volatile storage medium for an operating period, wherein the means for storing new data is configured to store new data in excess of the plurality of available single-level cell memory devices received during the operating period as single-level erase blocks in multi-level cell media devices.

* * * * *